Figure 1:
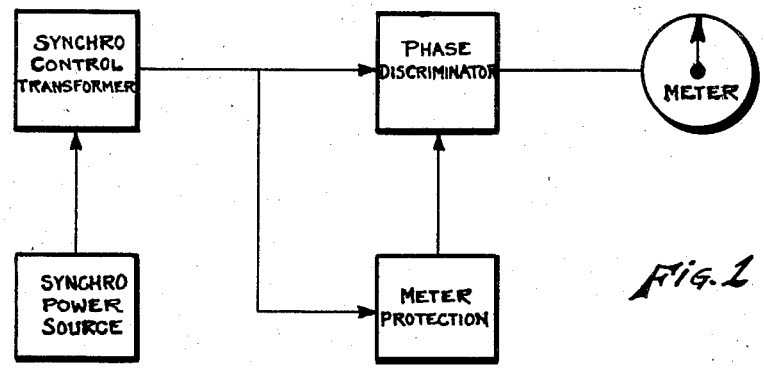

Feb. 25, 1958 R. H. CANADAY ET AL 2,825,049
ACCURACY MEASURING DEVICE
Filed Jan. 31, 1956 2 Sheets-Sheet 1

INVENTORS
ROSCOE H. CANADAY and WILLIAM C. KLEIN
BY
Arnold H. Cole
ATTORNEYS

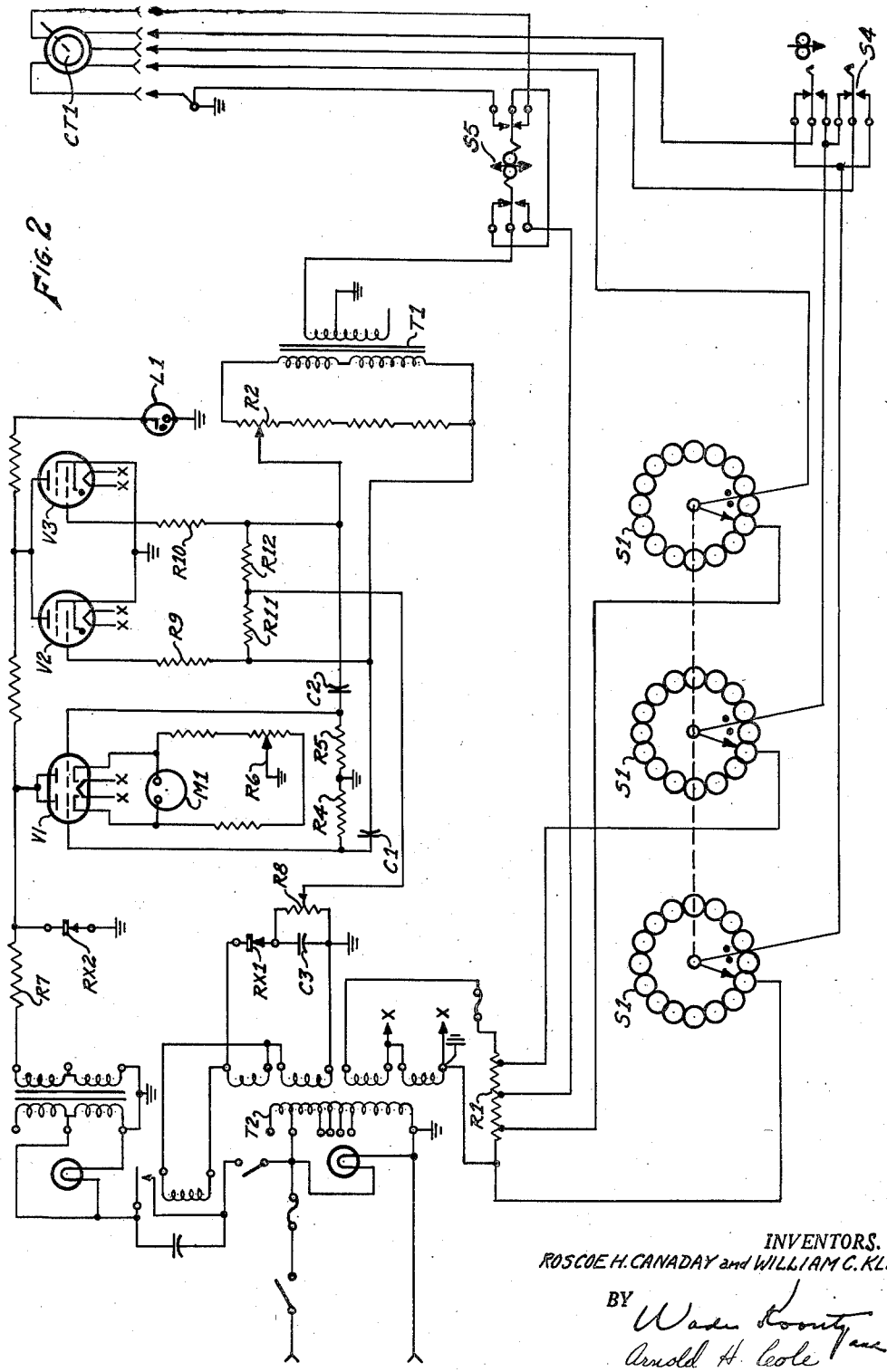

United States Patent Office 2,825,049
Patented Feb. 25, 1958

2,825,049

ACCURACY MEASURING DEVICE

Roscoe H. Canaday and William C. Klein, Rochester, N. Y., assignors, by mesne assignments, to the United States of America as represented by the Secretary of the Air Force Application January 31, 1956, Serial No. 562,619

6 Claims. (Cl. 340—268)

This invention relates to an accuracy measuring device wherein the position of a shaft in a mechanism may be determined with rapidity and a high degree of precision. Most often it is not the actual position of the shaft that is important, but rather the angular deviation of the shaft from a predetermined position is the value sought after. This is particularly true in inspections for quality control purposes.

At present a common method of measuring this deviation, or error, is to use a microscope to view a standard. The standard is generally an accurately indexed dial affixed to the end of the shaft being tested. If an operation requires one complete turn of the shaft, the microscope hairline is first aligned with a radial scratch on the dial. The mechanism is then operated to cause the shaft to theoretically turn through 360°, and the error, if any, is read on the microscope as the deviation of the scratch from the hairline. If an operation requires only one-quarter turn of the shaft, four scratch marks 90° apart would be made on the dial. An alternative method is to introduce a 1:4 gear ratio and use a dial with one scratch mark on the higher speed shaft. If the gear train is precise, the ability to read the error is increased four times since one degree on the dial represents ¼ of one degree on the shaft. These methods are limited to applications in which the tester has sufficient space to place and read the microscope. They are relatively slow and tedious, and do not lend themselves to indication at remote points.

The invention hereinafter described replaces the dial and the microscope with a synchro control transformer and a direct-reading error meter located at places accessible to the operator thereby making possible the convenient measurement of shaft positional error. In a particular embodiment of this invention it has been found possible to measure shaft deviation from a given angle with an accuracy as high as ±5 minutes of the shaft.

In general, a synchro is a device similar to a small electric motor. Essentially, it consists of a rotor element and a stator element, constructed to operate on single phase alternating current service. Usually the stator element is equipped with three coils or windings spaced 120° apart, and the rotor, which is mounted on a shaft and revolves within the stator, is provided with a single winding. When the rotor winding is energized with a field of magnetic flux is created, and voltages are accordingly induced in the stator windings. The magnetic flux varies sinusoidally with time, hence the current induced in the stator windings will also be alternating in character. The magnitude of the voltage induced in any single stator coil depends upon the orientation of the rotor coil axis with respect to the axis of that stator coil. The induced voltage is a maximum when such axes are in parallel relationship and is zero when such axes are perpendicular.

In this case the rotor is connected to the shaft to be tested, and the stator windings are energized by a precision voltage divider network. The rotor output is fed through a vacuum tube phase discriminator and is thereafter indicated on a zero-center meter. A meter protection system employing a pair of plate-voltage-reducing thyratrons is connected across the discriminator. Further, a calibrator circuit is provided for the device.

The primary objective of this invention is to provide an electrical testing device capable of producing rapid and accurate measurements of shaft positional errors.

Another object of this invention is to provide a testing device, the use of which is not restricted by space limitations, and from which measurements can be obtained at a remote point.

Figure 3:
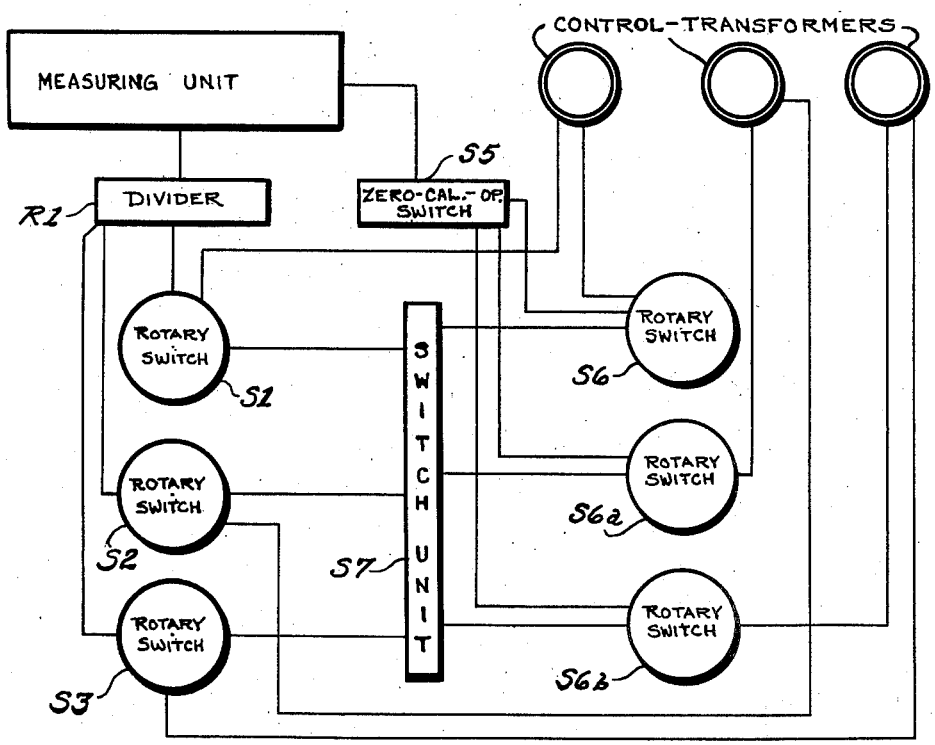

Further objects and advantages of the invention, as well as its construction, arrangement and operation, will be apparent from the following description and claims in connection with the accompanying drawings, in which:

Fig. 1 is a block diagram illustrating the relationships between the several elements of the device; and Fig. 2 is a schematic diagram of the entire device; and Fig. 3 is a block diagram showing the manner in which the device may be adapted for use with a plurality of control transformers.

Referring particularly to Fig. 2, the synchro control transformer is indicated at CT1 and the input transformer at T1. The three sets of stator voltage corresponding to a particular angle are supplied from a resistance voltage divider R1. In this divider it is preferred to use manganin wire because of its low temperature coefficient of resistance. A change in resistance due to non-uniform heating would upset the voltage ratio between the stator windings. The manganin wire may be wound on an open cross-shaped form to facilitate the adjustment of the several voltage taps.

In setting the voltage taps at the calculated values, it is desirable to work with ratios rather than with actual values since the ratios can be measured with greater accuracy. While setting each ratio, the synchro should be connected to the voltage divider since the loading effect of the synchro cannot be neglected.

A three pole rotary tap switch S1 is used to select the voltage taps required for the calculated shaft angle. The connections to other contacts on the switch have been omitted. Negative angles may be obtained by reversing two stator leads by means of switch S4.

In order to indicate the sense of the error as well as its magnitude, it is necessary to employ some form of phase discriminator. The type described here is designed to be linear, to be comparatively independent of changes in tube characteristics and to be of simple design since it requires no D. C. power supply.

A double-triode V1 is used as the discriminator. The plates of the tube are fed in parallel from the same source that energizes the synchro CT1. The grids are connected in push-pull, and receive their signal from the synchro CT1 through input transformer T1. The input comes through calibration control R2, hereinafter more fully described, and then through blocking capacitors C1 and C2. Resistors R4 and R5 are the grid returns.

If a signal is applied to the grids, one tube conducts more than the other during one half-cycle. During the other half-cycle neither tube conducts. Current flows through a meter M1 from the cathode of the more heavily conducting triode. Should the signal be of the opposite polarity the other triode will conduct more heavily, and the current through the meter will reverse. The meter M1 is of the zero-center type and has a low resistance. It essentially ties the two cathodes together with a common cathode resistor. The bias thus obtained puts the operating point in the linear region.

To compensate for differences between the halves of the tube V1, a variable resistor R6 is inserted in the cathode leads to enable the bridge to be balanced with a zero signal input. In this particular embodiment it has been found that the tube could be balanced to produce an equal (±1%) right hand and left hand full scale deflection.

The voltages induced in the rotor of the synchro control transformer CT1 may vary over a very wide range depending on the particular equipment with which this invention is used. Since only small errors are to be measured, full scale deflection may correspond to only a few volts. Accordingly, a means to protect the meter against an overload is incorporated into the device.

Such a means comprises thyratrons V2 and V3. The thyratrons are used to reduce the plate voltage of phase discriminator V1 when the input voltage exceeds a predetermined value. The only time the meter M1 might be subjected to excessive voltage is when the plates of tube V1 are positive, and therefore the thyratrons V2 and V3 are not required to operate except during that half-cycle. The thyratron grids are connected in push-pull so that in the event of large signals either one or the other of the thyratrons V2 and V3 will conduct. A resistor R7 is used to limit the current through the thyratrons as well as to provide the proper reduced plate voltage for the tube V1 when one of the thyratrons conducts.

The bias imposed on the thyratron grids determines the input signal level at which the thyratrons will conduct. The grid bias voltage is obtained through a rectifier RX1 and a filter capacitor C3. A variable resistor R8 is provided to adjust the bias voltage to the desired level.

The meter protection means also includes thyratron grid protecting resistors R9 and R10, and grid return resistors R11 and R12.

When one of the thyratrons is conducting, the meter reading has no validity because of the greatly reduced plate voltage on tube V1. As an indication of such a condition the neon lamp L1 is connected across the plates of thyratrons V2 and V3. A rectifier RX2 is employed to shunt the lamp during the negative half-cycle in order to prevent the latter from producing a false indication. The meter M1 should be read only when the lamp L1 is lit.

Here, as in any metering device, the matter of basic sensitivity and changes in sensitivity is very important. To that end a means for calibrating the instrument is provided. This means may be used to compensate for any changes in line voltage from day to day and for changes in characteristics of the tubes employed.

To calibrate the instrument, a calibrate signal, equivalent to the output necessary to give full scale deflection, is obtained from the tapped resistance voltage divider R1. The signal is then fed through the input transformer T1 via an operate-calibrate-zero switch S5. The calibration control resistor R2 is then adjusted until the meter M1 indicates full scale deflection.

The measuring device is connected to a source of alternating current through a transformer T2. A plurality of protective fuses and indicating lamps may be connected in the source circuit in any well-known arrangement.

In many installations it may be desirable to operate a plurality of synchro control transformers in the course of a test. One such application of the instant device is shown in the block diagram of Fig. 3. The switch banks S6, S6a and S6b are provided to permit the switching of two stator leads and one rotor lead for each synchro control transformer used whereby any interactions or loading effects are precluded. Rotary tap switches S2 and S3, similar to switch S1, are connected to the voltage divider R1, and a multiple switch unit S7 is substituted for the switch S4. The remaining elements are connected in substantially the same manner as described in connection with Fig. 2.

The number of angles which can be tested by the principle of this invention is limited only by the number of taps needed on the resistance voltage divider. An instrument with thirty-three indexing angles is now in service. If the angles to be checked are selected so that the synchro control transformer shaft angle is an integral part of a circle, the number of taps required can be greatly reduced.

Although particularly described as a device to measure angular displacement of a rotating member, the principle of this invention can be readily applied to the measurement of translatory displacement of a reciprocating member. The only modification necessary would be the attachment of rack and pinion gearing to convert linear motion to rotational motion.

It is to be understood that the above-described arrangements are merely illustrative of the applications of the principles of the invention. Numerous other arrangements may be devised by those skilled in the art without departing from the spirit and scope of the invention.

What is claimed is:

1. An accuracy measuring device for determining deviation of a shaft from a predetermined position comprising a synchro control transformer having a rotor adapted for connection to said shaft, a source of alternating current for said synchro control transformer, a phase discriminator connected to receive signals from said synchro control transformer, such signals being caused by voltages induced in said synchro control transformer upon deviations of said shaft from said predetermined position, means for measuring the instantaneous voltage output of said discriminator, said means comprising a zero-center meter from which the amount and sense of deviation can be read directly, and a protection system connected to said meter and said discriminator to prevent excessive voltages from reaching said meter, said system including a pair of thyratrons having their grids connected in push-pull, and signal means connected across said thyratrons for indicating when a valid reading can be obtained from the meter.

2. A device as defined in claim 1, wherein means are provided to calibrate the device to compensate for changes in source voltage and/or tube characteristics.

3. An accuracy measuring device for determining deviation of a shaft from a predetermined position comprising a synchro control transformer having a rotor adapted for connection to said shaft, a source of alternating current for said synchro control transformer, a phase discriminator connected to receive signals from said synchro control transformer, such signals being caused by voltages induced in said synchro control transformer upon deviations of said shaft from said predetermined position, said discriminator comprising a double-triode vacuum tube having its plates connected to said alternating current source, means for measuring the instantaneous voltage output of said discriminator, said means comprising a zero-center meter from which the amount and sense of deviation can be read directly, said meter being connected across the cathodes of said vacuum tube, and a protection system connected to said meter and said discriminator to prevent excessive voltages from reaching said meter, said system including a pair of thyratrons having their grids connected in push-pull, and signal means connected across said thyratrons for indicating when a valid reading can be obtained from the meter.

4. An instrument for measuring the deviation of a shaft from a preset position comprising a source of alternating current, a synchro control transformer having a rotor operatively connected to said shaft, said transformer being connected to said source, phase discriminating means responsive to an input from said transformer caused by deviation of said shaft from its preset position, the output of said discriminating means being fed to a zero-center meter, the arrangement being such that said meter indicates the output in terms of the amount and sense of deviation of the shaft, and protective means connected to said meter for protecting the latter from overload.

5. An instrument as defined in claim 4, wherein the shaft has rotary motion and the meter indicates angular deviation.

6. An instrument as defined in claim 4, in which the shaft has reciprocatory motion and is connected to the rotor through a rack and pinion gearing, said meter indicating linear deviation.

References Cited in the file of this patent

UNITED STATES PATENTS

| 2,405,568 | Ferrill | Aug. 13, 1946 |
| 2,473,682 | Harris et al. | June 21, 1949 |